Dec. 2, 1947.  R. J. FISHER  2,431,859
TWO CYCLE ENGINE, CRANKCASE COMPRESSION, VALVE PISTON
Filed June 28, 1945  3 Sheets-Sheet 1

Inventor
Reginald J. Fisher
by
Atty

Patented Dec. 2, 1947

2,431,859

UNITED STATES PATENT OFFICE 2,431,859

TWO-CYCLE ENGINE, CRANKCASE COMPRESSION, VALVE PISTON

Reginald John Fisher, Leamington Spa, England

Application June 28, 1945, Serial No. 602,081
In Great Britain July 14, 1944

8 Claims. (Cl. 123—73)

This invention relates to internal combustion engines working on the two-stroke cycle, and has for its object to provide a two stroke cycle engine in which only the exhaust ports are controlled by the movement of the piston, the transfer of the precompressed charge from the crank chamber or precompression pump into the cylinder taking place through a valve which does not depend for its opening on the position of the piston.

According to the invention the precompressed charge enters the cylinder through a port situated in the piston head and controlled by a valve closure member guided for free movement between its seat and movement limiting means, the opening force on the valve due to excess of pressure on the side remote from the cylinder being unopposed except by forces due to the inertia of the valve closure member itself.

The valve closure member is preferably so balanced that there are no inertia forces acting on it in the direction of its opening and closing movement. The piston head may be provided with a conical guiding surface which, when the valve closure member is off its seat, co-operates therewith to direct the charge towards the centre of the cylinder head, and helical vanes may be provided at at least one side of the valve closure member to give a whirling motion to the charge passing through the port. A part of the piston head may be formed to a shape closely corresponding to that of the cylinder head, this part of the piston head being arranged to approach closely to the cylinder head so as to produce turbulence of the charge.

The invention is hereinafter described with reference to the accompanying drawings, in which.

Figure 1:
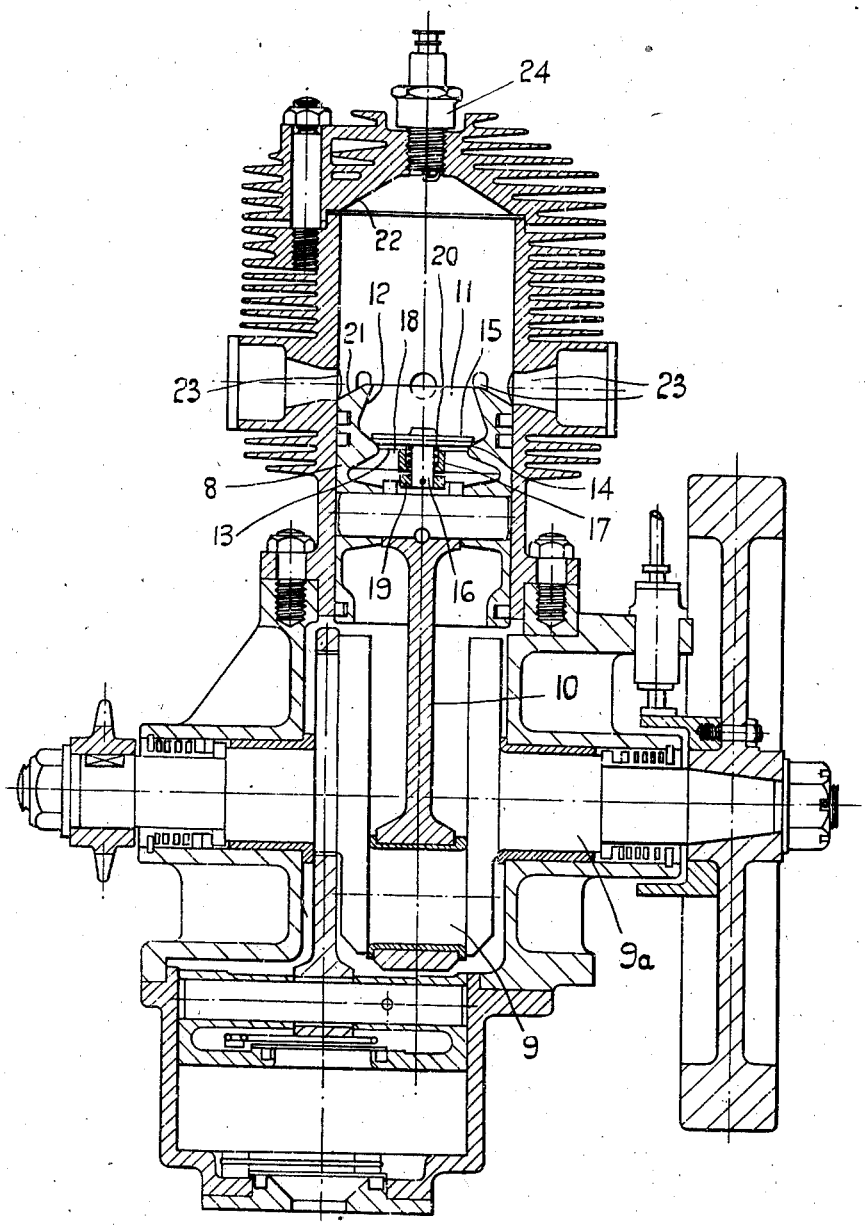
Fig. 1 is a sectional elevation of one form of single cylinder air cooled internal combustion engine according to the invention, the section being in the plane of the axis of the crankshaft.
Figures 2, 8:
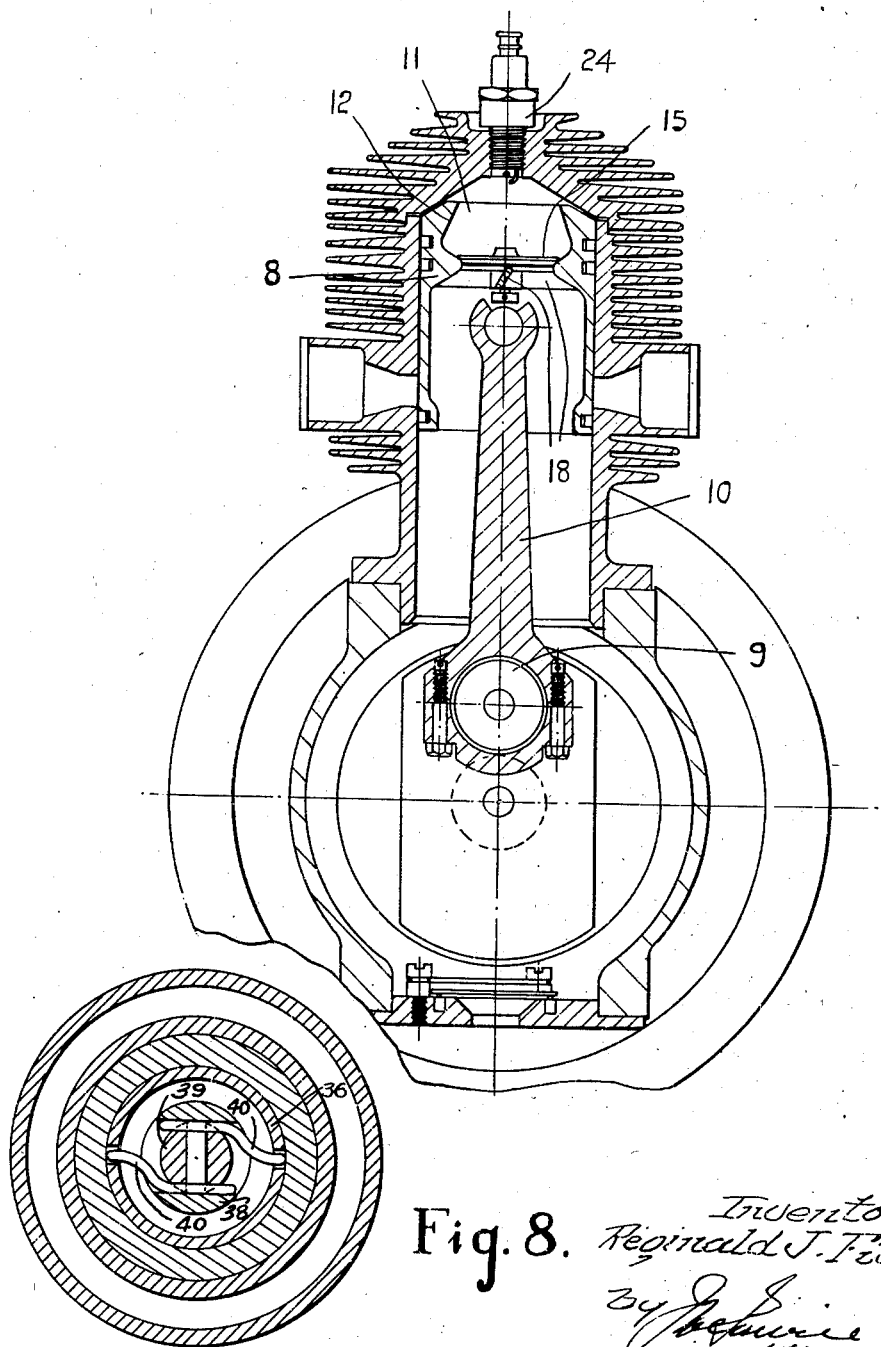
Fig. 2 is a section at right angles to Fig. 1 of a similar, but slightly modified engine.
Fig. 8 is a transverse section on the line 8—8 of Fig. 6.

In the form of engine shown in Fig. 1 the piston 8 which is coupled to a crankpin 9 on a crankshaft 9a by a connecting rod 10, is formed with a central recess 11 in its crown, the side walls 12 of which converge towards the mouth of the recess. In the base of the recess is a large coaxial port 13 leading through to the underside of the piston, and the base of the recess around the port 13 provides a seat 14 for a valve closure member 15 in the form of a flat disc to which is secured a stem 16. The disc is smaller in diameter than the recess. A boss 17 in the centre of the port 13 is supported by radial arms 18 which may, as shown in Fig. 2, take the form of helical vanes, and the stem 16 of the valve closure member passes through the boss. A collar 19 on the lower end of the stem limits the upward movement of the valve closure member, and a spring 20 housed in the boss acts to urge the valve closure member towards its open position.

The part 21 of the piston head surrounding the recess 11 is shaped to conform closely to a registering part 22 of the cylinder head, and approaches closely to the cylinder head as the piston reaches its top dead centre position, thus forcing the charge in the cylinder to move radially inwardly, and producing turbulence. A ring of exhaust ports 23 is formed in the cylinder wall, and is uncovered by the piston 8 as it approaches its bottom dead centre position.

The operation of the engine is as follows: Assuming that the piston 8 is at the top dead centre position and a charge in the cylinder has just been ignited, the pressure above the piston is much greater than the pressure below and the valve disc 15 is held on its seat. The piston 8 is thus moved downwardly until the exhaust ports 23 begin to open, and the spent charge flows outwardly through them. During the downward movement of the piston 8, a fresh charge is compressed on its under side, and as soon as the pressure above the piston 8 has fallen sufficiently to reverse the pressure difference across the valve disc 15, the latter is lifted, and the new charge flows into the cylinder, being directed upwardly towards the centre of the cylinder head by the convergent walls 12 of the recess 11. The remaining spent charge is thus directed towards the walls of the cylinder and downwardly towards the exhaust ports 23, and no substantial mixing of the new charge with the spent charge takes place. A point is reached when the pressures above and below the piston are equalised, and the valve disc 15 closes. When the piston 8 passes its bottom dead centre position and begins to move upwardly the exhaust ports 23 are closed and the charge in the cylinder begins to be compressed, so that there is again a pressure difference holding the valve disc 23 closed. The charge is thus compressed during the upward stroke of the piston 8, until the top dead centre position is reached, the charge ignited as by the sparking plug 24 and the cycle repeated.

The vanes 18 tend to produce a whirling motion of the charge, thus tending to set up a vortex in the cylinder, and the exhaust ports may be tangential or inclined to the radial direction in such a direction that the vortical motion assists the flow of the exhaust gases into them.

With the arrangement above described, the inertia of the valve disc 15 tends to seat it during the deceleration of the piston as its approaches its bottom dead centre, and the acceleration as it commences its upward stroke. As the pressure difference between the upper and lower sides of the piston 8 is not very great at this time, this inertia effect would tend to close the port before the full charge was transferred to the cylinder. To avoid this, the valve disc 15 is lightly loaded by the spring 20 towards its open position.

Figure 3:
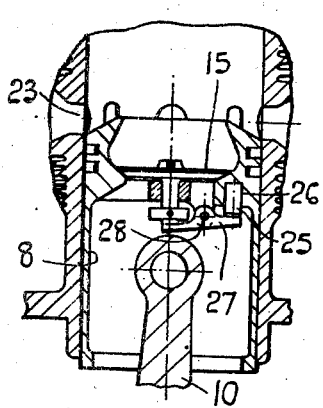
Fig. 3 is a fragmentary section through the piston of an engine showing a modified valve arrangement.

The spring 20 may be omitted, and the valve disc 15 counterweighted as shown in Fig. 3, one or more counterweights 25 being mounted in guiding recesses 26 in the underside of the piston, and being coupled to the valve disc by levers 27 pivoted at 28.

Figure 4:
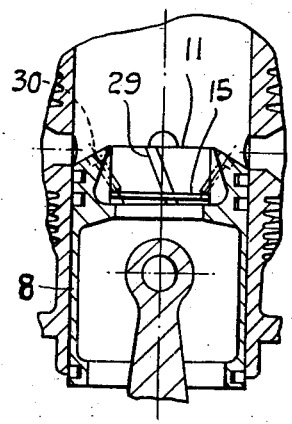
Figs. 4 and 5 are views similar to Fig. 3 showing other modified arrangements.

Fig. 4 shows an arrangement in which the valve closure member 15 is a plain disc guided by ribs 29 projecting from the walls of recess 11, and having its opening limited by set screws 30 extending obliquely through the piston head. The ribs 29 may be of helical form as shown, to create a whirling motion of the charge.

Figure 5:
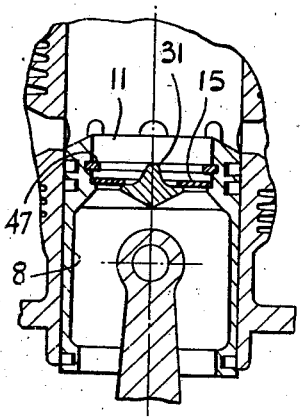

In the arrangement shown in Fig. 5, the valve disc 15 is annular in form, and co-operates with an annular port in the piston head. In this arrangement, the sides of the recess 11 in the piston head are parallel, the outer edge of the valve disc 15 fitting relatively closely therein, and the charge flowing past its inner edge, to be deflected upwardly by a conical boss 31 in the centre of the recess. In this arrangement, the opening of the valve disc is limited by a spring ring 47 located in a groove in the wall of the recess 11.

The valve closure member need not be arranged in a recess in the piston head, but may be substantially in the plane of the piston head surface when closed, the cylinder head being so formed that it is recessed opposite to the part of the piston head which carries the valve. Two arrangements of this kind are shown in Figs. 6 and 7, the cylinder head in Fig. 6 being formed with a central recess and the valve member being located in the centre of the piston, or as shown in Fig. 7, the valve member may be annular and surround a central part of the piston, the valve member forming a substantial part of the head of the piston.

Figure 6:
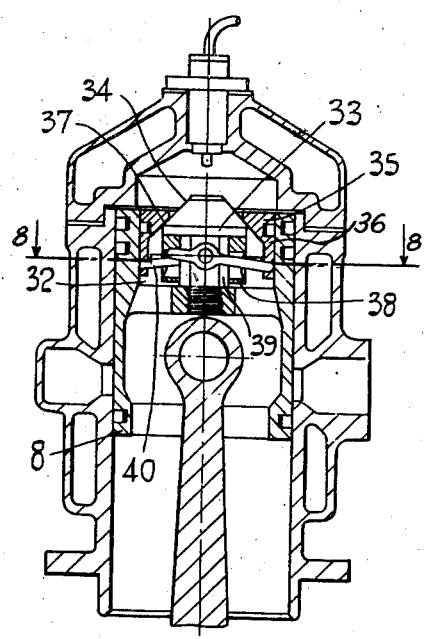
Figs. 6 and 7 show further modified valve arrangements incorporated in engines of the water-cooled type.

In the arrangement shown in Figs. 6 and 8, the piston 8 has a central recess 32 in its head, in which is located a co-axial boss 33 coned at 34 at its upper end to form a seating surface. The valve comprises a ring 35 sliding in the recess and having an upper part of substantially triangular cross-section from which depends a cylindrical wall portion 36. The upper part of the ring 35 has its inclined surface 37 opposite to the coned upper end 34 of the boss 33, so that when the said inclined surface 37 rests on the boss the passage through the piston is closed, and when the ring is lifted, the passage through the piston is open. The charge, passing between the inclined surfaces of the ring and boss, is directed inwardly and upwardly towards the centre of the cylinder head. The ring 35 is counterbalanced by an annular weight 38 sliding on a reduced portion 39 of the boss 33, and coupled to it by radial levers 40.

Figure 7:
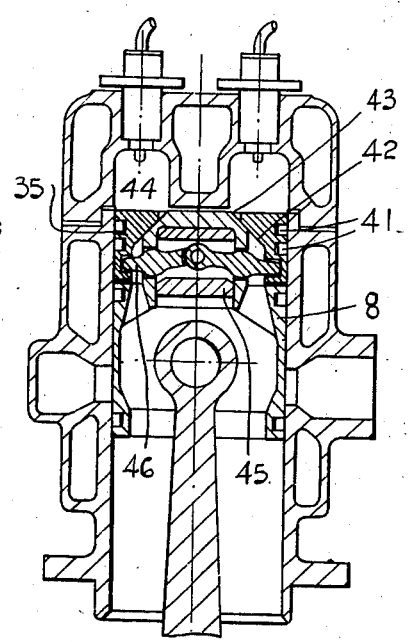

In the arrangement shown in Fig. 7, the ring 35 which forms the valve member is of the full diameter of the piston 8, and may be provided with piston rings 41 making it a gas-tight fit in the cylinder, an internal coned face 42 on the ring 35 mating with a coned surface 43 on a central boss 44 on the piston, as described in the immediately proceeding example. In this case the valve member 35 is balanced by a counterweight 45 mounted inside the boss 44 and connected to the valve member by levers 46. In this latter arrangement, the valve member forms a substantial part of the piston head.

The invention may be applied to a double-acting engine, a valve being arranged in each of the working faces of the piston, the appropriate valve opening automatically to admit a charge to either end of the cylinder when the pressure conditions are suitable.

In engines in which the charge is precompressed by means other than the descent of the piston towards the crank chamber, the charge may be delivered to a circumferential series of ports around the cylinder below the exhaust ports in the piston when the latter is at or near its bottom dead centre position. The ports in the piston lead into a chamber in the piston, which chamber is connected by a port, controlled by the valve closure member according to the invention, to the upper side of the piston.

The invention is clearly applicable to engines in which ignition is effected by means of a spark, or to engines of the compression ignition type, and, although described with reference to a single cylinder engine, is equally applicable to multi-cylinder engines.

I claim:

1. In a two stroke cycle internal combustion engine, a cylinder, a piston reciprocable in said cylinder, exhaust ports in said cylinder exposed by the piston as it approaches its bottom dead centre position, a port situated in the piston head to transmit a pre-compressed charge to the cylinder, a valve seat, a valve closure member co-operating with said seat for closing said port, movement limiting means limiting the opening of said valve closure member, and means which act upon the valve closure member to oppose the closing force thereon due to the inertia of said member, during deceleration of the piston approaching the bottom dead center position and acceleration of the piston leaving the bottom dead center position, the opening and closing of said valve closure member being controlled by pressure differences on its two sides.

2. In a two stroke cycle internal combustion engine, a cylinder, a piston reciprocable in said cylinder, exhaust ports in said cylinder exposed by the piston as it approaches its bottom dead centre position, a port situated in the piston head to transmit a pre-compressed charge to the cylinder, a valve seat, a valve closure member co-operating with said seat for closing said port, movement limiting means limiting the opening of said valve closure member, and balancing means connected to said valve closure member to balance the inertia forces acting thereon, said valve closure member being controlled solely by pressure differences on its two sides.

3. In a two stroke cycle internal combustion engine, a cylinder, a piston reciprocable in said cylinder, exhaust ports in said cylinder exposed by the piston as it approaches its bottom dead centre position, a port situated in the piston head to transmit a precompressed charge to the cylinder, a valve seat, a valve closure member co-operating with said seat for closing said port, movement limiting means limiting the opening of said valve closure member, a conical guiding surface on said piston head, said valve closure member being movable freely between the seat and the position defined by said movement limiting means and in the latter position co-operating with the conical guiding surface to direct the charge towards the center of the cylinder head, and means which act upon the valve closure member to oppose the closing force thereon due to the inertia of said member, during deceleration of the piston approaching the bottom dead center position and acceleration of the piston leaving the bottom dead center position, the opening and closing of said valve closure member being controlled by pressure differences on its two sides.

4. A two stroke cycle internal combustion engine according to claim 2, wherein the valve closure member is counterbalanced by a mass or masses mounted in the piston for movement in the direction of reciprocation of the piston and connected to the valve closure member by a lever or levers.

5. A two stroke cycle internal combustion engine according to claim 2, wherein the valve closure member is annular and has an internal conical face seating on a convex conical face on the piston.

6. A two stroke cycle internal combustion engine according to claim 2, wherein the valve closure member is annular, has an internal conical face seating on a convex conical face on the piston, and is counterbalanced by a co-axial weight which it surrounds, and to which it is connected by levers.

7. A two stroke cycle internal combustion engine according to claim 2, wherein the valve closure member is annular, has an internal conical face seating on a convex conical face on the piston, is of the full diameter of the piston, and is provided with piston rings making it a gastight fit on the cylinder.

8. In a two-stroke cycle internal combustion engine, a cylinder, a piston reciprocable in said cylinder, exhaust ports in said cylinder exposed by the piston as it approaches its bottom dead center position, a port situated in a recess in said piston head to transmit a precompressed charge to the cylinder, a valve seat, a valve closure member cooperating with said seat for closing said port, movement limiting means limiting the opening of said valve closure member, an annular surface on said piston surrounding the recess therein, a surface in the cylinder head conforming substantially in shape to said annular surface and adapted to be approached closely by said annular surface to produce turbulence of the charge, and means which act upon the valve closure member to oppose the closing force thereon due to the inertia of said member, during deceleration of the piston as it approaches the bottom dead center position and acceleration of the piston as it leaves the bottom dead center position, the opening and closing of said valve closure member being controlled by pressure differences on its two sides.

REGINALD JOHN FISHER.

REFERENCES CITED

The following references are of record in the file of this patent:

UNITED STATES PATENTS

| Number | Name | Date |
|---|---|---|
| 741,559 | Smith | Oct. 13, 1903 |
| 803,078 | Thompson | Oct. 31, 1905 |
| 1,010,754 | Hall | Dec. 5, 1911 |
| 1,107,501 | Duryea | Aug. 18, 1914 |
| 1,333,635 | Sawtelle | Mar. 16, 1920 |
| 1,413,912 | Harper | Apr. 25, 1922 |

FOREIGN PATENTS

| Number | Country | Date |
|---|---|---|
| 4,443 | England | 1912 |